US005159356A

United States Patent [19]

Soga et al.

[11] Patent Number: 5,159,356

[45] Date of Patent: Oct. 27, 1992

[54] WEB PRINTING APPARATUS

[75] Inventors: Hiromu Soga; Takeshi Kaga, both of Sagamihara; Manabu Sawada, Yokohama, all of Japan

[73] Assignees: Nippon Steel Corporation; Nippon Steel Chemical Co., Ltd., both of Tokyo, Japan

[21] Appl. No.: 574,783

[22] Filed: Aug. 30, 1990

[30] Foreign Application Priority Data

Sep. 4, 1989 [JP] Japan ................................ 1-230144

[51] Int. Cl.[5] ............................................ G01D 15/06

[52] U.S. Cl. ................................ 346/157; 346/76 PH; 346/153.1; 355/289

[58] Field of Search ................ 346/76 PH, 153.1, 157; 355/289

[56] References Cited

U.S. PATENT DOCUMENTS

| | | | |
|---|---|---|---|
| 4,099,186 | 7/1978 | Edwards et al. | 346/74.1 |
| 4,117,498 | 9/1978 | Edwards et al. | 346/74.1 |
| 4,134,676 | 1/1979 | Mehl | 355/77 |
| 4,145,300 | 3/1979 | Hendricks | 8/471 X |
| 4,191,961 | 3/1980 | Edwards et al. | 346/74.1 |
| 4,246,331 | 1/1981 | Mehl et al. | 8/471 X |
| 4,357,618 | 11/1982 | Ragland | 346/159 |
| 4,514,744 | 4/1985 | Saitoh et al. | 346/153.1 |
| 4,518,976 | 5/1985 | Tarumi et al. | 346/153.1 |
| 4,538,163 | 8/1985 | Sheridon | 346/155 |
| 4,636,815 | 1/1987 | Yuasa | 346/153.1 |
| 4,767,420 | 8/1988 | Mehl et al. | 8/470 |
| 4,816,846 | 3/1989 | Kollarits | 346/157 |

FOREIGN PATENT DOCUMENTS

| | | | |
|---|---|---|---|
| 0078784 | 5/1983 | Japan | 346/76 PH |
| 0208073 | 12/1983 | Japan | 400/120 |
| 0113266 | 6/1985 | Japan | 346/157 |
| 0287770 | 12/1986 | Japan | 346/76 PH |
| 0046662 | 2/1987 | Japan | 400/120 |
| 0050172 | 3/1987 | Japan | 346/76 PH |

OTHER PUBLICATIONS

IBM Technical Disclosure Bulletin *Resistive Ribbon Printing Method With Minimal Use of Supplies* May 1985 pp. 7212–7213.

*Primary Examiner*—Benjamin R. Fuller
*Assistant Examiner*—Randy W. Gibson
*Attorney, Agent, or Firm*—Pollock, Vande Sande & Priddy

[57] ABSTRACT

A web printing apparatus includes a recording sheet supply reel for continuously supplying a recording sheet on which a pattern can be or has been electrostatically recorded, a web supply reel for continuously supplying a web, and a transporting device for continuously transporting the recording sheet through a recording section and through a processing section in such a manner that the web is brought into close contact with the recording sheet at the processing section, an electrostatic recording device provided, if necessary, at the recording section for electrostatically and continuously recording a desired pattern on the recording sheet passing through the recording section, by using a toner including sublimate dye; and a heat transfer unit provided at the processing section for heating portions of the recording sheet and the web which are mutually brought into close contact with each other at the processing section thereby transferring the pattern recorded on the recording sheet onto the web.

11 Claims, 4 Drawing Sheets

WEB PRINTING APPARATUS

BACKGROUND OF THE INVENTION

1. Field of the Invention

The present invention relates to a web printing apparatus for transferring onto a web or the like a pattern which has been developed and fixed on an electrostatic recording sheet by using a toner including a sublimate dye.

2. Description of Related Art

In printing a pattern on a web of cloth, the printing has been generally carried out by applying dye ink through a printing cylinder such as a photogravure (intaglio) cylinder or a rotary screen to the web. In this case, when it is necessary to change the pattern to be printed, the printing cylinder must be changed. Thus, the conventional web printing system is suitable for a mass production, but is not suitable for a diversified small-quantity production.

Further, a maximum size of the pattern which can be printed is limited by the size of the available printing cylinder such as the size of the photogravure printing cylinder or the peripheral surface area of the rotary screen. Accordingly, when it is required to print a pattern on a web having a size larger than the limited size, the web is divided into a plurality of small areas, each having a size not larger than the limited size, and a printing of small pattern is repeatedly applied to the respective areas so that the web is printed by a series of identical small patterns. According to this method, the web seems at a glance as being printed by one piece of pattern. However, since the whole pattern is in fact composed of a series of small identical patterns, it is different from one piece of large pattern. Further, even a very skilled worker will find it very difficult to print a series of patterns with indistinguishable boundaries between every adjacent patterns.

Further, there is a method of making a small quantity of printed web in which a pattern formed on a transfer sheet having a paste surface by a thermal-transfer recording apparatus or the like is transferred onto a web, in the manner similar to iron printing.

The above iron printing method is suitable for diversified small-quantity production. However, since this method uses a process of transferring a pattern on a transfer paper having a paste surface by a thermaltransfer recording apparatus, and then fixing the paste surface onto the surface of a web by heating the paste with an iron press, it involves a problem that the printed pattern can be very easily removed when the web is washed or subjected to similar treatment.

In printing a multicolored pattern a heat transfer recording apparatus or the like is used to print color-separated images of the pattern, respectively, for three primary colors on a transfer sheet, it is required to make three reciprocal movements of the transfer sheet through a thermosensitive head portion or to make three revolutions of the transfer sheet around a rotary drum. Therefore, there is a limit of the length of a transfer sheet which can be made by one printing process, and it is generally impossible to make a continuous printing of one piece pattern on a whole surface of a web of cloth having a length of several tens of meters.

SUMMARY OF THE INVENTION

It is an object of the present invention to provide a web printing apparatus capable of printing a pattern on a web in a continuous printing process and which is hard to remove.

It is another object of the present invention to provide a web printing apparatus capable of continuously executing both a process of transferably forming a desired pattern on a recording sheet and a process of transferring the pattern formed on the recording sheet onto a surface of a web.

According to one aspect of the present invention, a web printing apparatus comprises: recording sheet supply means for continuously supplying a recording sheet on which a desired pattern is formed with a toner including a sublimate dye; web supply means for continuously supplying a web onto which the pattern is to be transferred; means for transporting the recording sheet continuously supplied from the recording sheet supply means and the web supplied from the web supply means through a processing section so as to bring them into a close contact with each other at the processing section and thermal transfer means provided at the processing section for heating a portion of the recording sheet and a portion of the web passing through the processing section in close contact with each other thereby transferring the pattern formed on the portion of the recording sheet onto the portion of the web.

According to another aspect of the present invention, a web printing apparatus comprises: recording sheet supply means for continuously supplying a recording sheet on which a pattern can be electrostatically recorded; web supply means for continuously supplying a web; transporting means for continuously transporting the recording sheet from the recording sheet supply means through a recording section and a processing section and for continuously transporting the web from the web supply means through the processing section, so that the web is brought into close contact with the recording sheet at the processing section; electrostatic recording means provided at the recording section for electrostatically and continuously recording a desired pattern by a toner including a sublimate dye on the recording sheet as passing through the recording section; and thermal transfer means for heating a portion of the recording sheet and a portion of the web passing through the processing section in close contact with each other, thereby transferring a pattern recorded on the portion of the recording sheet onto the portion of the web.

DETAILED DESCRIPTION OF THE PREFERRED EMBODIMENTS

Figure 1:
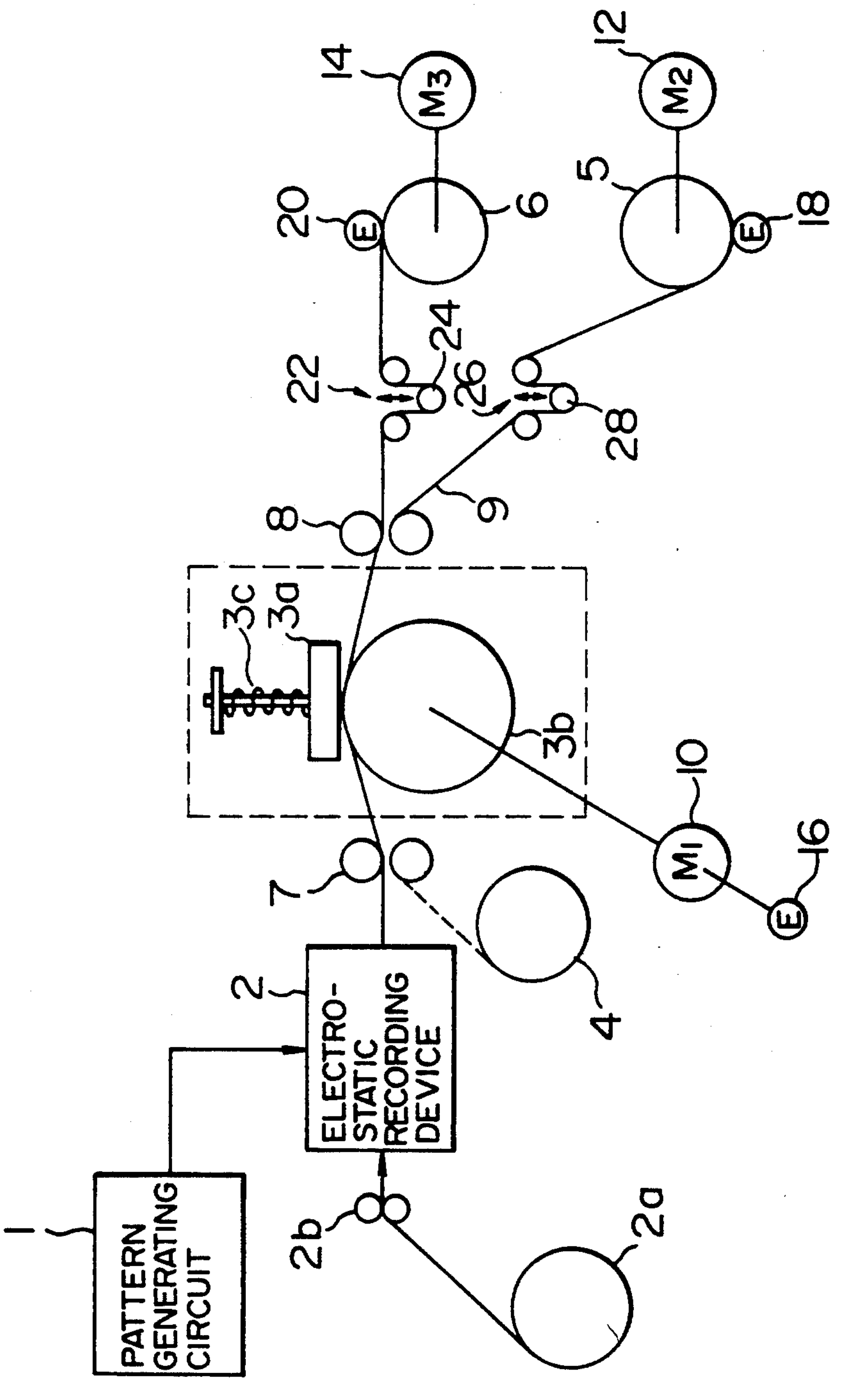
FIG. 1 is a diagram showing the structure of one embodiment of a web printing apparatus of the present invention.

Embodiments of the present invention will be explained below with reference to the drawings. FIG. 1 is a diagram showing the structure of one embodiment of a web printing apparatus of the present invention which is applied to a case where printing is made on a web of cloth.

The web printing apparatus in the present embodiment includes an electrostatic recording device 2, a thermal transfer device 3, a web supply reel 4, a web winding reel 5, a recording sheet supply reel 2a, a recording sheet winding reel 6, web and recording sheet guide rollers 7 and 8, and tension adjusters 22 and 26 disposed between the guide roller 8 and the respective winding reels. A pattern signal generating circuit 1 such as a CAD is connected to the electrostatic recording device 2.

Figure 2:
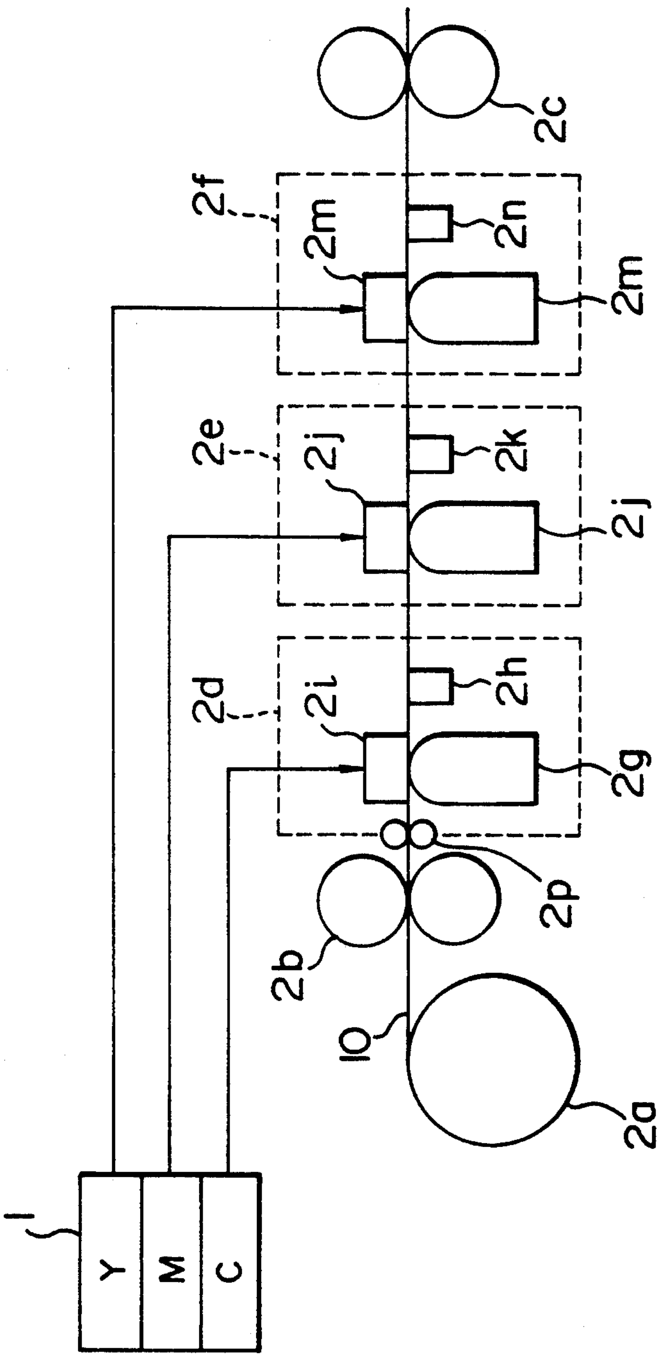
FIG. 2 is a diagram showing the structure of an electrostatic recording device.

The electrostatic recording device 2 is a so-called one-pass type electrostatic recording device as disclosed in Japanese Patent Unexamined Publication No. JP-A-60-113266, such as, NS-GRPHY X2010, manufactured by Nippon Steel Corporation. FIG. 2 shows the structure of this device, the operation of which will be described later.

The thermal transfer device 3 has a heating unit 3a and a platen roller 3b.

A pattern signal to be printed is applied to the electrostatic recording device 2 from a pattern generating circuit 1. In accordance with the pattern signal supplied, the electrostatic recording device 2 selectively stores a charge in a recording sheet 10 supplied from the recording sheet supply reel 2a, to form an electrostatic latent image of the pattern. The electrostatic recording device 2 then develops and fixes the electrostatic latent image with a toner including a sublimate dye, and prints the pattern on the recording sheet 10, which has substantially the same width and length as those of a web as described later. The recording sheet on which the pattern is printed by the electrostatic recording device is transported to the thermal transfer device 3 through the guide roller 7. Simultaneously, a web 9 of cloth having a width of, for example, one meter and a length of several tens of meters, is continuously supplied through the roller 7 from the web supply reel 4. The web 9 and the printed recording sheet 10 are brought into a close contact with each other through the rollers 7 and 8 and the platen roller 3b, and pressed by the heating unit 3a against the platen roller 3b.

In the thermal transfer device 3, the recording sheet 10 is heated by the heating unit 3a, the sublimate dye in the toner particles is sublimatetransferred from the recording sheet 10 onto the web 9 so that the pattern is printed on the surface of the web 9.

The printed web 9 is wound up on the web winding reel 5, and the recording sheet 10 is wound up on the recording sheet winding reel 6. The tension adjusters 26 and 22 are provided for adjusting winding tensions of the web and the recording sheet wound by the respective reels.

The heating unit 3a is a metal block into which an electrical heating resistor (not shown) is buried, and a plate of heat-proof rubber is bonded to the side of the block which is brought into contact with the platen roller 3b. The heat generated by the electrical heating resistor is controlled by a suitable temperature adjusting unit (not shown) so that the temperature of the surface of the heat-proof rubber plate which is in contact with the platen roller is maintained at a range of 180° C. to 200° C. The heating unit 3a is urged against the platen roller by a spring 3c, and the heat-proof rubber plate is slightly deformed by the pressure of the spring 3c so that the plate is brought into face-to-face contact with the platen roller 3b. As a result, the heat of the heating unit is transmitted to both the recording paper and the web.

The platen roller 3b, the web winding reel 5 and the recording sheet winding reel 6 are respectively driven by AC motors 10, 12 and 14. On the other hand, the recording sheet supply reel 2a and the web supply reel 4 are provided with mechanical friction brakes (not shown), respectively, so as to apply suitable tension to the recording sheet and the web that are wound up. The revolution speeds of the AC motors 10, 12 and 14 are controlled by the control circuit shown in FIG. 4 so that the recording sheet 10 and the web 9 are driven always at the same speed.

Figure 4:
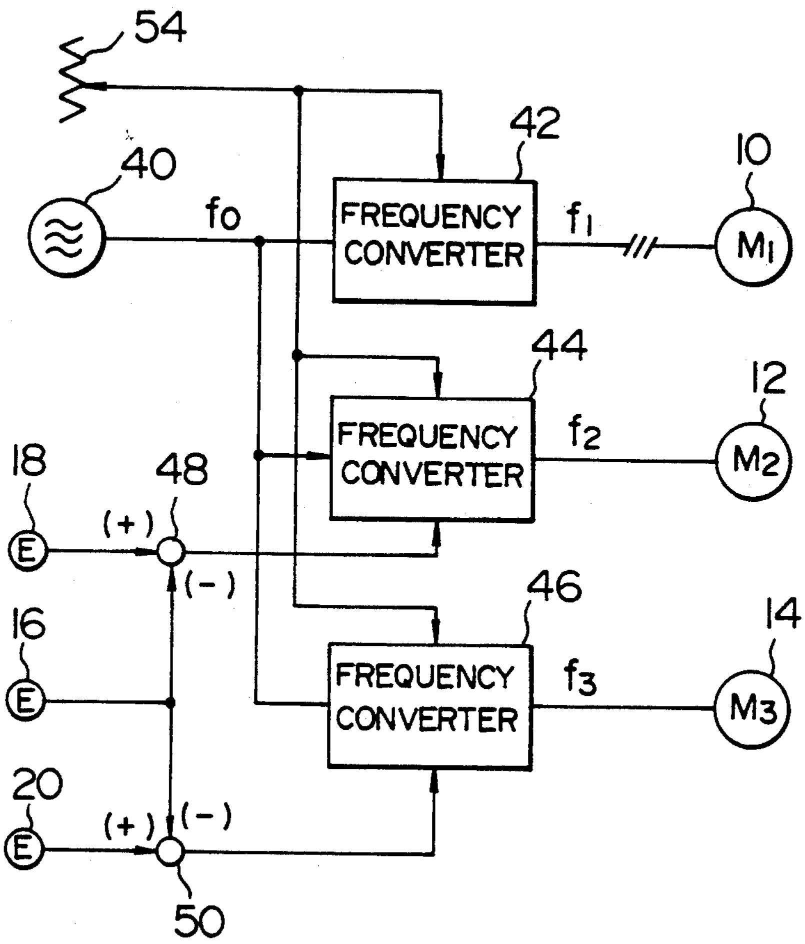
FIG. 4 is a block diagram showing the control circuit of a driving unit of the web printing apparatus in FIG. 1.

As shown in FIG. 4, the motors 10, 12 and 14 are connected to an AC power source 40 through frequency converters 42, 44 and 46 respectively for converting a frequency $f_0$ of the AC power source 40 to frequencies $f_1$, $f_2$ and $f_3$, respectively. The revolution speeds of the motors 10, 12 and 14 are substantially proportional to the frequencies $f_1$, $f_2$ and $f_3$ respectively. Values of the frequencies $f_1$, $f_2$ and $f_3$ are basically determined by a speed command given by a speed command generator 52, that is, a voltage signal of which value is proportional to a desired running speed of the recording sheet or the web. Values of the frequencies $f_2$ and $f_3$ are corrected by error signals applied from adders 48 and 50 as described later. Encoders 18 and 20 are provided to the web winding reel 5 and the recording sheet winding reel 6 respectively, so as to generate, respectively, signals indicative of the running speeds of the recording sheet and the web when they are wound up on the respective reels. An encoder 16 is connected to the platen roller and generates a signal indicative of the surface speed of the platen roller 3b.

The frequency converter 42 is set so as to make the surface speed of the platen roller 3b equal to the speed command, when the motor 10 is driven by an AC voltage having the frequency $f_1$ which is generated in accordance with a voltage signal proportional to a speed command supplied by the speed command generator 52. On the other hand, the frequency converters 44 and 46 are set so as to make the running speeds of the web and the recording sheet equal to the speed command as wound up by the empty reels 5 and 6, respectively, when the motors 12 and 14 are driven respectively by the frequencies $f_2$ and $f_3$ in accordance with a voltage signal proportional to a speed command supplied by the speed command generator 52. As the recording sheet and the web are gradually wound up on the reels, the diameters of the wound-up reels become larger so that the speeds in winding up of the recording sheet and the web will increase if the motor revolution speed is constant. Therefore, in order to compensate for the speed change, the output voltages of the encoders 20 and 18 indicative of the winding speeds of the recording sheet and the web are compared with an output voltage of the encoder 16 representing the desired or reference running speed. When any one of the outputs of the encoders 18 and 20 becomes larger than the output of the encoder 16 by an error value larger than a predetermined value, an output of the adder 48 or 50 which indicates the error, causes an output frequency of the corresponding frequency converter 42 or 46 to change to a one-step lower frequency. Accordingly, the revolution speed of the motor 10 or 14 is reduced by one step so that the winding speed of the recording sheet or the web is reduced. A small error between the winding speed of the web or the recording sheet wound by the reel 5 or 6 and the running speed of the web or the recording sheet driven by the platen roller is absorbed by the tension adjuster 26 or 22. For this purpose, the tension adjuster 22 includes a vertically movable roll 24 which provides a variable loop of the recording paper and which applies a predetermined tension to the recording sheet by its self-weight. The loop length changes by the vertical movement of the roll 24, and the difference between the winding speed of the recording sheet by the reel 6 and the reference speed is absorbed by the change of the loop length. The tension adjuster 26 also operates in the similar manner. The reference speed is about 1 to 5 m/sec. These tension adjusters are not always necessary but are desirable in order to cause the web or recording sheet to be wound by the reel with a constant tension.

Next, the electrostatic recording device 2 will be described. As shown in FIG. 2, the electrostatic recording device 2 includes carrier rollers **2*b* and 2*c* for carrying the recording sheet supplied from the recording sheet supply reel 2*a*, and three electrostatic recording units 2*d*, 2*e* and 2*f* provided between the carrier rollers 2*b* and 2*c*. The electrostatic recording unit 2*d* prints a pattern of cyan C one of the three primary colors, the electrostatic recording unit 2*e* prints a pattern of magenta M, and the electrostatic recording unit 2*f* prints a pattern of yellow Y. Although the three electrostatic recording units are disposed in tandem in the recording sheet running direction in this embodiment, another electrostatic recording unit for printing a pattern of black may be provided. The electrostatic recording units 2*d*, 2*e* and 2*f* comprise, respectively, electrostatic heads 2*g*, 2*j* and 2*m*, auxiliary electrodes 2*i*, 2*l* and 2*o*, and developing and fixing units 2*h*, 2*k* and 2*n*** for developing and fixing patterns with a toner including a sublimate dye.

A recording sheet to be used for the electrostatic recording device has a laminated structure including a layer of insulation material which provides a charge bearing surface and a layer of conductive material which provides a zero-potential electrode when a pattern signal is applied through the electrostatic head from the pattern generating circuit. The electrostatic recording head has a large number of recording electrodes arranged in one row or zig-zag in two parallel rows over a length corresponding to the whole width of the recording sheet. A pattern to be recorded is stored in the pattern generating circuit in the form of color-separated signals which represent the respective color components of the pattern as color-separated. Each of the color-separated signals is represented by a binary signal indicative of the color density in each dot of the dot matrix obtained by dividing the pattern into rows in width-wise direction of the recording sheet and columns in length-wise direction. A degree of resolution of the recorded pattern is determined by density of the dots. The abovedescribed electrostatic recording device NS-GRAPHY X2010 manufactured by Nippon Steel Corporation has 400 dots/inch. In each recording unit, the recording sheet is moved in a direction at a right angle to the row of the recording electrodes, that is, in the length-wise direction of the recording sheet. At every movement of a predetermined distance corresponding to the pitch of the dots in the length-width direction of the recording sheet, the pattern signal corresponding to the dots in one row in the width-wise direction of the recording sheet is applied to the recording sheet from the pattern generating circuit 1 through the electrostatic heads. A latent image of the pattern according to the pattern signal as applied is electrostatically formed on the charge bearing surface of the recording sheet. The latent image thus formed is developed by a toner to obtain a visible image of the pattern corresponding to the latent image.

On the recording sheet 10 supplied from the recording sheet supply reel **2*a*, a color-separated signal corresponding to the cyan is first applied from the pattern generating circuit 1 to form an electrostatic latent image corresponding to the cyan component of the pattern. A toner of the cyan is applied to the recording sheet by the developing and fixing unit 2*h*, to develop the latent image by the toner of cyan and fix the developed image. Then, the recording sheet is sent to the next electrostatic recording unit 2*e*. The developing and fixing unit operates for development by a toner, vacuum attraction of toners and oil not used for development of the latent image and drying of the developed toner image. Next, the pattern of magenta is printed in registration with the pattern of cyan by using a toner of magenta M at the electrostatic recording unit 2*e* in the same manner as above-mentioned. After drying, the pattern of yellow Y is printed at the electrostatic recording unit 2*e***. Thus, printing of multicolored pattern is performed by registration of the patterns of three primary colors.

Figure 5:
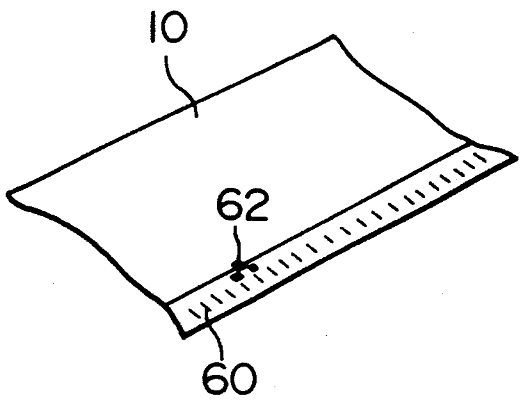
FIG. 5 is a diagram showing an example of the marks for color registration.

In order to obtain registration of a plurality of color-images, at a marker 2P disposed before the first recording unit **2*d*, tracking mark 60 and a start mark 62 are recorded in black along a longitudinal edge of the recording sheet, as shown in FIG. 5**. If a black color recording unit is provided, this unit can be utilized as a marker. In each recording unit, a detector (not shown) for detecting the tracking mark and the start mark is disposed at a position having an accurate predetermined positional relationship with the electrostatic head of the recording unit. The start mark is used for determining a starting point on the recording sheet in printing of a given block of a pattern by each recording unit, and the tracking mark is used for determining a timing of applying a color-separated signal to the electrostatic head of each recording unit so that the color-separated signals corresponding to the dots of one row of the pattern are printed at the same position on the recording sheet by the respective recording units.

The electrostatic recording devices 2 is of the one-pass type as described above. Therefore, the direction of transporting a recording sheet is always constant to direct to the heat transfer device 3, so that it is not necessary to rewind the web 9 to match the rewinding of the recording sheet, thus enabling the continuous mode of the process.

On the other hand, if a conventional so-called multipass type electrostatic recording device is used in which one electrostatic head and three developing units are used, and the recording sheet is rewound each time one color of a multicolored pattern is printed, so that it requires to make three passes of the recording sheet through the recording device for printing the multicolored pattern, it is necessary to rewind also the web according to the rewinding of the recording sheet, which makes the structure and control complex. For example, in the cases of FIGS. 1 and 2, the web supply reel 4, the web winding reel 5 and the recording sheet winding reel 6 must also be rotated in the opposite direction in accordance with the reverse rotation of the recording sheet supply reel 2a, which makes the control complex. Further, it may cause a deviation between the web and the recording sheet in rewinding them, resulting in a problem of a pattern deviation. Therefore, according to the conventional system, printing on the recording sheet and printing on the web surface cannot be integrated in one continuous process. According to the conventional system, a recording sheet is once printed with a pattern with sublimate dyes by a recording unit or an electrostatic recording unit of heat transfer system, and the recording sheet is wound up on the reel. Then, the pattern on the recording sheet is heat transferred on the surface of the web. On the other hand, in the apparatus of the present invention, the process of preparing a recording sheet printed with a pattern (that is, a transfer of a pattern on the recording sheet) and the process of heat transfer of the pattern from the recording sheet onto the surface of the web can be performed as one continuous process. This is very advantageous, particularly in the case of printing on a long web.

A second embodiment of the present invention will be explained next.

Figure 3:
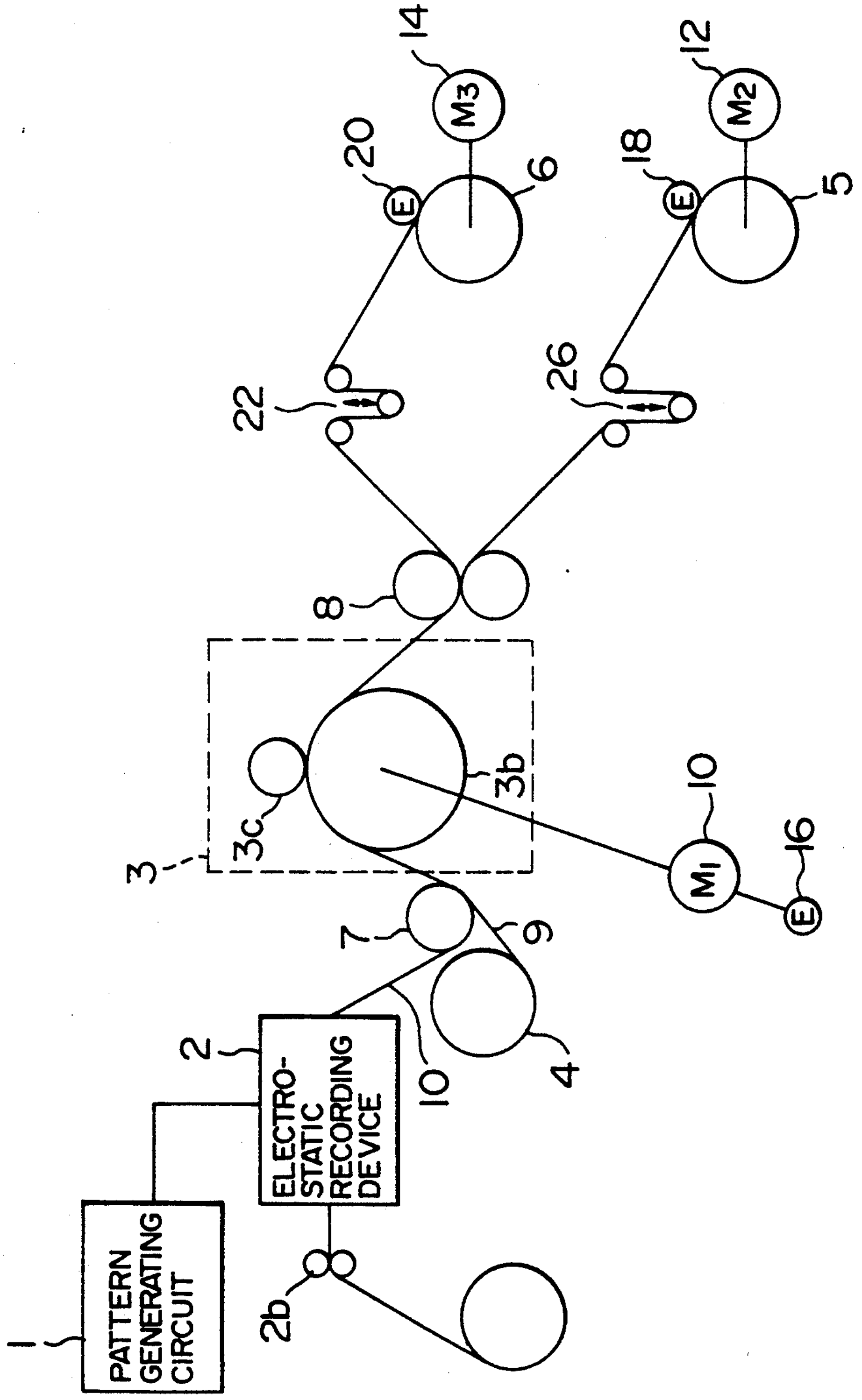
FIG. 3 is a diagram showing the structure of another embodiment of web printing apparatus of the present invention.

FIG. 3 is a diagram showing the second embodiment of the present invention. In FIG. 3, a heating roller 3c is provided instead of the block-type heating unit 3a of the heat transfer device 3 in FIG. 1. The heating roller 3c is a hollow roller made of metallic material such as steel and covered by heatproof rubber, and an infrared ray heater (or a lamp) is mounted in the roller. The heating roller 3c is heated to a temperature of 180° C. to 200° C. The roller in rotation presses the recording sheet and the web against the platen roller 3b and heats the recording sheet so as to transfer a pattern formed on the recording sheet onto the web surface. Since the recording sheet and the web are heated under high pressure in this embodiment, the heat transfer speed can be increased. Further, since the heating unit rotates, it is effective to transport smoothly the recording sheet and the web.

Further, if a heating unit is incorporated in the platen roller 3b in FIGS. 1 and 3, heat transfer speed is more increased. In this case, when it is arranged to cause the web and the recording sheet to wrap the platen roller as shown in FIG. 3, the web and the recording paper are heated through a longer distance by the platen roller in the transportation path so that the transporting speed of the recording sheet can be correspondingly increased, resulting in an increase of the transfer speed.

The heating means to be used is not limited to the above-described infrared ray heater, but other heating means may be used instead.

In the above embodiments, the process of electrostatically recording a pattern on the recording sheet and the process of heat transfer of the pattern recorded on the recording sheet onto the web surface are carried out in one continuous process. However, it is also possible to make such an arrangement that a recording sheet on which a pattern has been electrostatically recorded in advance is set in the recording sheet supply reel, and the recorded pattern is continuously heat transferred onto the web supplied from the web supply reel. In this case, in the above embodiments, the electrostatic recording device 2 is omitted and the recording sheet is directly sent to the heat transfer unit from the recording sheet supply reel.

We claim:

1. A web printing apparatus comprising:

an electrostatic recording sheet supply means for continuously supplying an electrostatic recording sheet on which a desired pattern is formed by using a toner including a sublimate dye, said electrostatic recording sheet supply means including:

a recording sheet supply roll for supporting and continuously supplying an electrostatic recording sheet wound thereon;

means for forming an electrostatic latent image of the desired pattern on said continuously supplied electrostatic recording sheet; and means for applying a toner including the sublimate dye to said electrostatic recording sheet on which said electrostatic latent image of the pattern is formed thereby forming a toner image corresponding to said latent image;

web supply means for continuously supplying a web onto which said pattern is to be transferred;

transporting means for transporting through a processing section said electrostatic recording sheet continuously supplied from said recording sheet supply means and said web continuously supplied from said web supply means in such a manner that said electrostatic recording sheet and said web are brought in close contact with each other at said processing section; and heat transfer means provided in said processing section for heating portions of said electrostatic recording sheet of said web which are in close contact with each other and thereby sublimate-transferring the sublimate dye included in the toner image formed on said electrostatic recording sheet onto said web.

2. A web printing apparatus comprising:

an electrostatic recording sheet supply means for continuously supplying an electrostatic recording sheet on which a pattern can be electrostatically recorded;

web supply means having a web supply roll for supporting and continuously supplying a web;

means for transporting said electrostatic recording sheet from said recording sheet supply means through a recording section and a processing section and for continuously transporting said web from said web supply means through said processing section in such a manner that said web is brought in close contact with said recording sheet at said processing section;

an electrostatic recording means provided in said recording section for continuously and electrostatically recording a desired pattern on said electrostatic recording sheet passing through said recording section by using a toner including a sublimate dye, said electrostatic recording means including:

means for forming electrostatic latent image of the desired pattern on said electrostatic recording sheet; and means for applying a toner including the sublimate dye to the electrostatic recording sheet with the electrostatic latent image formed thereon thereby forming a toner image corresponding to said latent image; and heat transfer means provided in said processing section for heating portions of said recording sheet and said web which are mutually brought into contact with each other at said processing section thereby sublimate-transferring the sublimate dye included in the toner image formed on said electrostatic recording sheet onto said web.

3. A web printing apparatus according to claim 2, wherein said web is a cloth.

4. A web printing apparatus according to claim 2, wherein said means for forming an electrostatic latent image includes a plurality of recording units through which said recording sheet passes sequentially; each of said recording units includes means for applying one of different color-separated signals relating to said pattern to said recording sheet thereby forming an electrostatic latent image of the one color-separated signal and said means for applying a toner includes a plurality of developing units associated with said recording units, respectively, each of said developing units including means for developing the electrostatic latent image formed on said recording sheet by the associated recording unit by using a toner of color corresponding to said color-separated signal.

5. A web printing apparatus according to claim 4, wherein said plurality of recording units record color components of the pattern in cyan, magenta and yellow, respectively.

6. A web printing apparatus according to claim 4, wherein said electrostatic recording means includes means for recording on said recording sheet a mark before said recording sheet passes a first one of the recording units for determining a timing for applying one of the color-separated signals to each recording unit so that the patterns formed on said recording sheet by the color-separated signals are in registration with each other.

7. A web printing apparatus according to claim 2, wherein said electrostatic recording device includes a plurality of recording units for different colors including black, said recording units being so disposed that said recording sheet first passes through the recording unit for black and then sequentially passes the recording units for the colors other than black, and said recording unit for black includes means for recording on said recording sheet a mark for determining a timing for applying one of color-separated signals to each of the recording units for the other colors so that respective patterns formed on said recording sheet by the recording units for the other colors are in registration with each other.

8. A web printing apparatus comprising:

an electrostatic recording sheet supply means for continuously supplying an electrostatic recording sheet on which a desired pattern is formed by using a toner including a sublimate dye, said electrostatic recording sheet supply means including:

a recording sheet supply roll for supporting and continuously supplying an electrostatic recording sheet wound thereon;

means for forming an electrostatic latent image of the desired pattern on said continuously supplied electrostatic recording sheet; and means for applying a toner including the sublimate dye to said electrostatic recording sheet on which the electrostatic latent image of the desired pattern is formed thereby forming a toner image corresponding to said latent image;

web supply means having a web supply roll for supporting and continuously supplying an elongated web wound thereon;

transporting means for transporting through a processing section said continuously supplied electrostatic recording sheet and said continuously supplied web in such a manner that said electrostatic recording sheet and said web are brought in close contact with each other at said processing section; and heat transfer means provided in said processing section for heating portions of said electrostatic recording sheet and said web which are in close contact with each other at said processing section and thereby sublimate-transferring the sublimate dye included in the toner image formed on said electrostatic recording sheet to said elongated web.

9. A web printing apparatus comprising:

electrostatic recording sheet supply means for continuously supplying an electrostatic recording sheet on which a pattern can be electrostatically recorded;

web supply means having a web supply roll for supporting and continuously supplying an elongated web wound thereon;

transporting means for continuously transporting the electrostatic recording sheet from said recording sheet supply through a recording section and a processing section and for continuously transporting said web through said processing section from said web supply roll in such a manner that said web is brought in close contact with said recording sheet at said processing section;

electrostatic recording means provided in said recording section for continuously and electrostatically recording a desired pattern on said recording sheet passing through said recording section by using a toner including sublimate dye, said electrostatic recording means including:

means for forming electrostatic latent image of the desired pattern on said electrostatic recording sheet supplied from said recording sheet supplying; and means for applying a toner including the sublimate dye to the electrostatic recording sheet with the electrostatic latent image formed thereon thereby developing the toner image corresponding to said latent image; and heat transfer means provided in said processing section for heating portions of said recording sheet and said elongated web which are in close contact with each other at said processing section thereby sublimate-transferring the sublimate dye included in the toner image formed on said recording sheet to said elongated web.

10. A web printing apparatus according to claim 8, wherein said means for forming an electrostatic latent image includes a plurality of recording units, each of said recording units including means for applying one of different color-separated signals relate to said pattern to said recording sheet thereby forming an electrostatic latent image of the one color-separated signal and means for applying toner includes a plurality of developing units associated with said recording units, respectively, each of said developing units including means for developing the electrostatic latent image formed by the associated recording unit by using a toner of color corresponding to said one color-separated signal.

11. A web printing apparatus according to claim 9, wherein said means for forming an electrostatic latent image includes a plurality of recording units, each of said recording units including means for applying one of different color-separated signals relating to said pattern to said recording sheet thereby forming an electrostatic latent image of the one color-separated signal and said means for applying a toner includes a plurality of developing units associated with said recording units, respectively, each of said developing units including means for developing the electrostatic latent image formed by the associated recording unit by using a toner for color corresponding to said one color-separated signal.

* * * * *